F. M. SCHMIDT.
TAILOR'S MEASURING APPARATUS.
APPLICATION FILED FEB. 24, 1910. RENEWED JUNE 6, 1912.
1,037,058.
Patented Aug. 27, 1912.
2 SHEETS—SHEET 2.
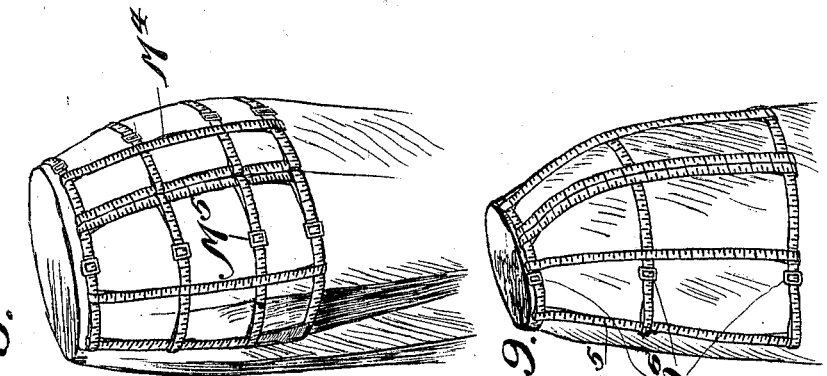
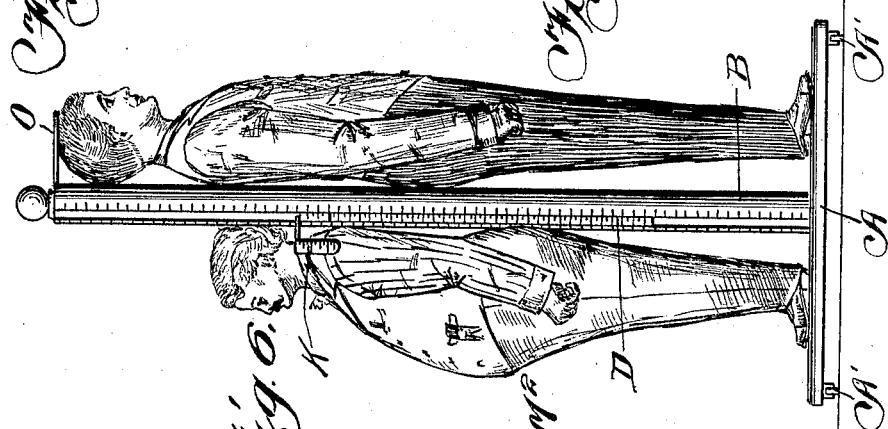
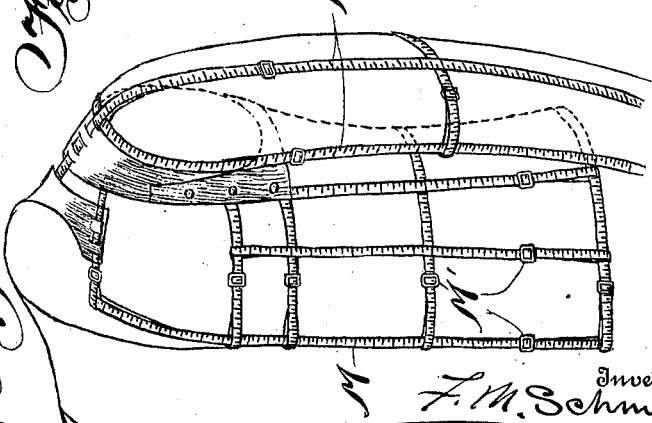

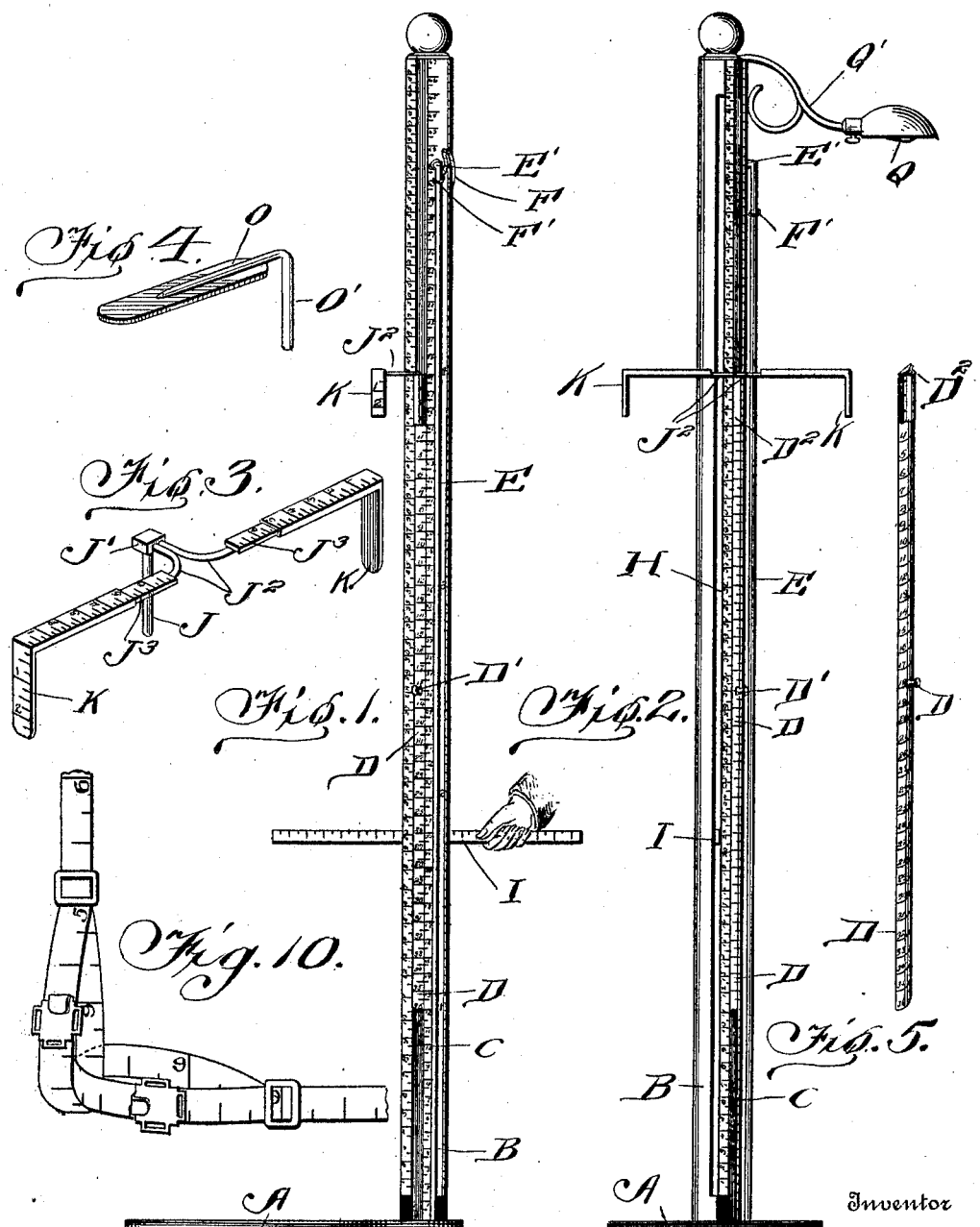

UNITED STATES PATENT OFFICE.

FRANK M. SCHMIDT, OF HAVRE DE GRACE, MARYLAND.

TAILOR'S MEASURING APPARATUS.

1,037,058.  Specification of Letters Patent.  Patented Aug. 27, 1912.

Application filed February 24, 1910, Serial No. 545,891. Renewed June 6, 1912. Serial No. 702,109.

*To all whom it may concern:*

Be it known that I, FRANK M. SCHMIDT, a citizen of the United States, residing at Havre de Grace, in the county of Harford and State of Maryland, have invented certain new and useful Improvements in Tailors' Measuring Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tailor's measuring apparatus and comprises simple and efficient means whereby the measurements for ladies and gentlemen's suits may be quickly and conveniently accomplished and comprises various details of construction and combination and arrangements of parts which will be hereinafter fully described and then specifically defined in the appended claims.

I illustrate my invention in the accompanying drawings, in which:—

Figure 1 is a side elevation of a standard having graduations thereon. Fig. 2 is a front elevation. Fig. 3 is a detail of a shoulder measuring device mounted upon an extensible part of the standard. Fig. 4 is a detail perspective of an attachment to the movable scale upon the standard. Fig. 5 is a detail perspective view of the sliding scale. Fig. 6 is a side elevation showing the application of the invention to persons standing upon the platform. Fig. 7 is a perspective view showing the adjustment of graduated straps to determine the measurements of a coat and sleeve. Fig. 8 is a view showing the adjustment of the straps for taking the measurements of a pair of trousers. Fig. 9 is a view of the straps arranged for taking the measurements of ladies' skirts, and Fig. 10 is a detail perspective view showing two of the straps connected together.

Reference now being had to the details of the drawings by letter, A designates a platform which, for convenience, is mounted upon casters A'. Rising from said platform adjacent to one end is a hollow standard B having a longitudinal recess C therein, in which a sliding scale D has a longitudinal movement. Said scale has graduations thereon 36 inches of its length and, for convenience in moving the same, is provided with a handle or knob D'. The standard has graduations which, in the drawings, extend over 67 inches. Rising from the platform is a rod E, the upper end E' of which is angled and is fastened to the standard, said rod E being parallel to the standard and spaced apart a slight distance therefrom. A tape measure, designated by letter F, has a ring F' fastened thereto and adapted to fit over said rod, said rod being provided for the purpose of attaching the tape and having it for convenient use in taking any body measurements desired. Said standard has a second longitudinal slot, designated by letter H, extending diametrically through the standard and in which a rule I may be inserted in the manner shown in Fig. 1 of the drawings and moved vertically for the purpose of getting the height of the seam of a pair of trousers. It will be noted that the numbers representing inches upon the standard commence a slight distance above the platform, preferably one and a quarter inches, from which the measurement of the trousers is adapted to commence.

In order to get the measurements of the width of the shoulders of a person, a member designated in detail in Fig. 3 of the drawings is shown, consisting of a pin J having a head J' from which project the two wires $J^2$, each having a scale $J^3$ fastened thereto which scales are in alinement with each other and right angled sliding scales K are mounted, one upon each scale $J^3$ and are adapted to be moved toward or away from each other to adjust the same for the purpose of measuring the width of a person's shoulders, the application of this part of the invention being illustrated in Fig. 6.

Referring to Fig. 4 of the drawings there will be seen a right angled device, designated by letter O, having a round shank portion O' designed to engage a hole $D^2$ formed in the upper end of the slide D. The device O may be utilized as shown in Fig. 6 of the drawings for determining the height of a person standing upon the platform. In order to throw light upon the figures of the scale so that the person taking measurements may see the parts readily, an incandescent light, designated by letter Q, is mounted upon the bracket arm Q' fastened to the standard.

In operation, the person to be measured stands upon the platform in the manner shown in Fig. 6 of the drawings and, by moving the scale I up or down, the height of the inner seam of the trousers may be determined which will be indicated upon the scale of the standard, the height of the person or the height for the length of the trousers as well as length of the coat may be measured by the scales upon the standard and the width of the shoulders may be determined by the adjustment of the angled scales. The device shown in Fig. 3 of the drawings will afford means for determining whether or not one shoulder is higher than the other and, if so, how much and such difference may be indicated upon the scales of the angled members. By the provision of the tape which is fastened by an eye to the rod E, measurements about the legs or the body of the person may be conveniently made, the tape measure being adapted to be held at different positions for this purpose. The graduated straps of tape are applied in sections to determine the measurements of the coat, trousers or skirt and after they have been adjusted to proper positions may be secured by the fasteners and the measurements transferred and laid off upon the goods to be cut, with or without first making patterns.

What I claim to be new is:—

1. A tailor's measuring apparatus comprising a standard and a platform from which it rises, said standard having a longitudinal groove, a sliding scale mounted therein and provided with a loop, and a shoulder measuring scale having a shank portion engaging said loop and movable therewith.

2. A tailor's measuring apparatus comprising a standard and a platform from which it rises, said standard having a longitudinal groove, a sliding scale mounted therein and provided with a loop, a shoulder measuring scale having a shank portion engaging said loop and provided with laterally extending arms with graduations thereon, and angled scales movable over said graduated arms.

In testimony whereof I hereunto affix my signature in the presence of two witnesses.

FRANK M. SCHMIDT.

Witnesses:
A. L. HOUGH,
FRANKLIN H. HOUGH.

---

Copies of this patent may be obtained for five cents each, by addressing the "Commissioner of Patents, Washington, D. C."